Patented July 3, 1934

1,965,304

UNITED STATES PATENT OFFICE 1,965,304

METHOD OF PREPARING STABLE CHLORINE CONTAINING COMPOUNDS

Howard Adler, Chicago Heights, Ill., assignor to Victor Chemical Works, a corporation of Illinois No Drawing. Application May 29, 1933, Serial No. 673,558

8 Claims. (Cl. 23—250)

This invention relates to an improved method of preparing stable chlorine-containing compounds.

It has previously been known that trisodium phosphates form mixtures or compounds with sodium hypochlorite which are quite stable, yet are capable of supplying available chlorine under desired conditions.

It has now been discovered that in the production of the compound by direct solidification of a molten mass rather than by crystallization from a solution, it is necessary in order to make a stable product of high available chlorine content, to adjust the alkalinity of such mixtures to a point slightly below that of the $Na_3PO_4$. In carrying out the invention, tri alkali metal phosphate such as trisodium phosphate and di alkali metal phosphate such as di-sodium phosphate are mixed and melted and a strong solution of sodium hypochlorite added thereto. The mixture is then cooled and crystallizes. The amount of water either of hydration or otherwise in the mixture must be low enough so that final crystallization can occur on cooling. Either the tri alkali metal phosphate or the di alkali metal phosphate or some of each are therefore anhydrous, the use of anhydrous disodium phosphate being preferred.

The proportions of the trisodium phosphate and disodium phosphate are so adjusted that the alkalinity factor of the finished product will be less than 1, preferably between 0.5 and 0.98, as determined by the formula:

$$\text{Alkalinity factor} = \frac{T_{m.o.}}{2(T_{m.o.} - T_{pH})}$$

where $T_{m.o.}$ is the titration to methyl orange and $T$ is the titration to phenolphthalein. The titration is carried out by adding 3 cc. of the product (before crystallization) to 50 cc. of distilled water, heating to boiling, adding 20 cc. of hydrogen peroxide, boiling until the peroxide is all decomposed, cooling, diluting to 75 cc. and titrating again with fifth normal hydrochloric acid to the methyl orange and phenolphthalein end points.

As an example of the invention 700 lbs. of partially anhydrous disodium phosphate (equivalent to 440 lbs. of the disodium phosphate) and 215 lbs. of 46.5% caustic soda were melted together in a tank by means of steam coils. The water content of the charge was then adjusted so that it had a Baumé gravity of 56.5 at 105° C. The charge was then transferred to a mixing tub and 310 lbs. of a strong sodium hypochlorite solution containing 14.4% available chlorine and 3% free caustic soda was added quickly to the molten phosphate and the mixture rapidly agitated until crystallization took place and the mass was thoroughly disintegrated. Agitation was continued until the mass had cooled below 35° C. The product had an alkalinity factor of 0.94 and contained 3.62 available chlorine in stable combination. The sodium hypochlorite was produced by passing chlorine into a caustic soda solution.

As a further example of the invention, 990 lbs. of trisodium phosphate crystals and 225 lbs. of anhydrous disodium phosphate were melted together, the Baumé gravity adjusted with water to approximately 56° Bé. at 100° C., and then 388 lbs. of a sodium hypochlorite solution containing 12.8% of available chlorine and 3.0% of caustic soda were added. The finished product in this case had an alkalinity factor of 0.95 and contained 3% available chlorine.

Instead of the disodium phosphate, other acid alkali metal salts may be used to adjust the alkalinity, but it is preferred that the resulting alkali metal salt formed be non-hygroscopic to prevent deterioration of the product. For example alkali metal acid sulphates may be used, and where desired it is possible to use in some instances the acids themselves, for example phosphoric, hydrochloric or sulphuric acids may be used to adjust the alkalinity factor, or phosphoric acid may be neutralized by caustic alkali or alkali metal salts to such a point that the resulting solution will have an alkalinity factor below one and a Bé. gravity of the order 56° at a temperature of 100° C.

The foregoing detailed description has been given for clearness of understanding only, and no unnecessary limitations should be understood therefrom, but the appended claims should be construed as broadly as permissible, in view of the prior art.

What I claim as new and desire to secure by Letters Patent is:

1. The method of producing a stable chlorine-containing compound which comprises adding a concentrated solution of an alkali metal hypochlorite to a molten mixture of tri alkali metal phosphate and a compound of the class consisting of acids and acid alkali metal salts, in which the proportion of the constituents is so adjusted that the alkalinity factor of the mixture is less than 1 and cooling and solidifying said mixture.

2. The method of producing a stable chlorine-containing compound which comprises adding a concentrated solution of an alkali metal hypochlorite to a molten mixture of tri alkali metal phosphate and an acid alkali metal salt, and cooling and solidifying said mixture.

3. The method as set forth in claim 2, in which said acid alkali metal salt is an acid alkali metal phosphate.

4. The method as set forth in claim 1, in which the Baumé gravity of the mixture of tri alkali metal phosphate and a compound of the class consisting of acids and acid alkali metal salts is of the order of 56° at 100° C.

5. The method of producing a stable chlorine-containing compound which comprises adding a concentrated solution of an alkali metal hypochlorite to a molten mixture of tri-alkali metal phosphate and a compound of the class consisting of acids and acid alkali metal salts, the proportions of the constituents being so adjusted that the alkalinity factor of the product is less than 1, and cooling and solidifying said mixture.

6. The method as set forth in claim 5 in which the proportion of the constituents is so adjusted that the alkalinity factor of the product is from 0.5 to 0.98.

7. The method as set forth in claim 1 in which the alkali metal is sodium.

8. The method of producing a stable chlorine-containing compound which comprises adding a concentrated solution of sodium hypochlorite to a molten mixture of trisodium phosphate and disodium phosphate having a Baumé gravity of the order of 56° at 100° C., and cooling and solidifying said mixture.

HOWARD ADLER.